United States Patent
Neeb

[15] 3,678,054
[45] July 18, 1972

[54] PROCESS FOR THE MANUFACTURE OF 6-NITRO-9- AMINO-2-ETHOXY-ACRIDINE

[72] Inventor: Rudolf Neeb, Oberishausen, Germany
[73] Assignee: Farbwerke Hoechst Aktiengesellschaft vormals Meister Lucius & Bruning, Frankfurt Main, Germany
[22] Filed: Oct. 9, 1970
[21] Appl. No.: 90,176

[30] Foreign Application Priority Data
    Oct. 16, 1969    Germany ..........................19 52 0866

[52] U.S. Cl. ......................................260/279 R, 260/555 R
[51] Int. Cl. ......................................................C07d 37/24
[58] Field of Search ..................................260/279 R, 296 R

[56] References Cited

OTHER PUBLICATIONS

Albert " The Acridines" 2nd edition St. Martin's Press NY. pp 366–7, 292–4 (1966).

*Primary Examiner*—Donald G. Daus
*Attorney*—Connolly & Hutz

[57] ABSTRACT

Process for the manufacture of 6-nitro-9-amino-2-ethoxy-acridine, wherein 6-nitro-9-chloro-2-ethoxyacridine is reacted with urea in a polar organic solvent in the presence of salts of weak bases with strong acids and, if desired or required, in the presence of catalytic amounts of an aromatic mono- or polyhydroxy compound.

2 Claims, No Drawings

PROCESS FOR THE MANUFACTURE OF 6-NITRO-9-AMINO-2-ETHOXY-ACRIDINE

The present invention provides an improved process for the manufacture of 6-nitro-9-amino-2-ethoxyacridine, which is an intermediate product for the manufacture of the lactate of 6,9-diamino-2-ethoxyacridine representing an antiseptic.

The technical preparation of 6-nitro-9-amino-2-ethoxyacridine is effected by condensation of 3-nitro-4'-ethoxydiphenylamine-6carboxylic acid with phosphorus oxychloride in xylene to yield 6-nitro-9-chloro-2-ethoxyacridine, subsequent reaction thereof with an excess of phenol to yield 6-nitro-9-phenoxy-2ethoxyacridine, removing distillation of the xylene and reaction of the 6-nitro-9-phenoxy-2-ethoxyacridine obtained as solution in phenol, with aqueous ammonia to yield 6-nitro-9-amino-2-ethoxyacridine (cf. BIOS No. 766, pages 14 – 15). The yield of 6-nitro-9-amino-2-ethoxyacridine according to this process is very unsatisfactory, since 6-nitro-2-ethoxyacridone is formed in a considerable amount as a by-product. On the subsequent reduction with iron according to Bechamp, this secondary substance becomes 6-amino-2-ethoxyacridone which is substantially insoluble under the reduction conditions and remains behind in the iron slime whereas the 6,9-diamino-2-ethoxy-acridine chlorohydrate passes into the filtrate and is isolated from that. The yield of 6,9-diamino-2-ethoxyacridine chlorohydrate, calculated on the 3nitro-4' -ethoxydiphenylamine-6carboxylic acid used, therefore, amounts only to about 35 percent of the theory. Besides, this process can only be performed under special security measures on account of the use of the toxic phenol as solvent.

The present invention is based on the observation that pure 6-nitro-9-amino-2-ethoxyacridine is obtained in an essentially better yield by reacting 6-nitro-9-chloro-2-ethoxyacridine with urea in a polar organic solvent in the presence of salts of weak bases with strong acids and, if desired or required, in the presence of catalytic amounts of an aromatic mono- or polyhydroxy compound.

The reaction is effected at about 160° – 180° C. By the coincident use of catalytic amounts of an aromatic mono- or polyhydroxy compound, for example resorcinol or hydroquinone, the reaction can already be carried out about 150° C. If desired or required, there can also be operated under atmospheric excess pressure.

Examples of polar solvents to be used in the process of the invention are especially glycols, for example ethylene or propylene glycol, polyglycols, for example di- or triethylene glycol, glycolic acid esters, for example glycolic acid methyl or ethyl ester, sulfones, for example tetramethylenesulfone, or aliphatic carboxylic acid amides, for example dimethylformamide or diethylacetamide.

As salts of weak bases with strong acids, for example the ammonium salts of inorganic acids, the hydrohalides of tertiary organic amines, as well as anhydrous salts of heavy metals may be used. For example, ammonium chloride or bromide, ammonium sulfates or phosphates, triethylamine or triethanolamine hydrochloride, dimethylaniline hydrochloride, pyridine hydrochloride, iron, copper or zinc chloride are suitable.

The 6-nitro-9-amino-2-ethoxyacridine obtainable according to the present invention may subsequently be reduced to yield the 6,9-diamino-2-ethoxyacridine. Yields of 65 - 85 percent of the theory, calculated on 6-nitro-9-chloro-2-ethoxyacridine, or 60 – 80 percent of the theory, calculated on 3-nitro-4'-ethoxydiphenylamine-6-carboxylic acid are obtained.

The following Examples illustrate the invention.

EXAMPLE 1 mixture of 250 parts by volume of ethylene glycol, 50 parts by weight of 6-nitro-9-chloro-2-ethoxyacridine (obtained by reacting 52 parts by weight of 3-nitro-4'-ethoxy-diphenylamine-6-carboxylic acid with phosphorus oxychloride), 10 parts by weight of ammonium chloride, and 11 parts by weight of urea were heated to 170° C. and stirred for 1 hour at 170° to 175° C. Subsequently, the whole was cooled to 100° C., the reaction mixture was introduced into 1,000 parts by volume of water, rendered acidic to Congo paper by means of hydrochloric acid and the 6-nitro-9-amino-2-ethoxyacridine precipitated was filtered off. By reduction with iron according to Bechamp, 6,9-diamino-2-ethoxyacridine-hydrochloride was obtained with a yield of 83 percent of the theory, calculated on 6-nitro-9-chloro-2-ethoxyacridine.

EXAMPLE 2

A mixture of 250 parts by volume of ethylene glycol, 50 parts by weight of 6-nitro-9-chloro-2-ethoxyacridine, 10 parts by weight of ammonium chloride, 11 parts by weight of urea, and 1 part by weight of resorcinol was heated to 150° C and stirred for 2 hours at 150° – 155° C. Then, the whole was cooled to 100° C, the reaction mixture was introduced into 1,000 parts by volume of water, rendered acidic to Congo paper by means of hydrochloric acid and the 6-nitro-9-amino-2-ethoxyacridine was filtered off. After reduction with iron according to Bechamp, 6,9-diamino-2-ethoxyacridine-hydrochloride was obtained with a yield of 78 percent of the theory, calculated on 6-nitro-9-chloro-2-ethoxyacridine.

The following Table lists further Examples for the reaction of 6-nitro-9-chloro-2-ethoxyacridine with urea:

| polar solvent | salt of weak base with a strong acid | temperature | yield |
|---|---|---|---|
| ethylene glycol | ammonium bromide | 170°C | 79 % |
| ethylene glycol | ammonium sulfate | 170°C | 79 % |
| ethylene glycol | ammonium bisulfate | 170°C | 63 % |
| ethylene glycol | diammonium phosphate | 170°C | 68 % |
| ethylene glycol | monoammonium phosphate | 170°C | 69 % |
| ethylene glycol | triethylamine hydrochloride | 170°C | 65 % |
| ethylene glycol | dimethylaniline hydrochloride | 170°C | 67 % |
| ethylene glycol | triethanolamine hydrochloride | 170°C | 66 % |
| ethylene glycol | pyridine hydrochloride | 170°C | 69 % |
| ethylene glycol | iron (III) chloride | 170°C | 75 % |
| ethylene glycol | copper (II) chloride | 170°C | 74 % |
| ethylene glycol | zinc chloride | 170°C | 70 % |
| diethylene glycol | ammonium chloride | 160°C | 61 % |
| tetramethylene sulfone | ammonium chloride | 160°C | 72 % |
| dimethyl formamide | ammonium chloride | 150°C | 55 % |

We claim:

1. A process for the manufacture of 6-nitro-9-amino-2-ethoxyacridine, wherein 6-nitro-9-chloro-2-ethoxyacridine is reacted with urea in a polar organic solvent in the presence of salts of weak bases with strong acids.

2. A process as claimed in claim 1, wherein the reaction is carried out additionally in the presence of catalytic amounts of an aromatic mono- or polyhydroxy compound.

* * * * *